United States Patent
Mandelli

(10) Patent No.: US 8,098,314 B2
(45) Date of Patent: Jan. 17, 2012

(54) NOISE REDUCTION FOR ANALOG VIDEO APPLICATIONS

(75) Inventor: Emanuele Mandelli, Santa Monica, CA (US)

(73) Assignee: AltaSens, Inc, Westlake Village, CA (US)

( * ) Notice: Subject to any disclaimer, the term of this patent is extended or adjusted under 35 U.S.C. 154(b) by 391 days.

(21) Appl. No.: 12/401,808

(22) Filed: Mar. 11, 2009

(65) Prior Publication Data

US 2010/0231796 A1 Sep. 16, 2010

(51) Int. Cl.
*H04N 5/335* (2006.01)
*H04N 5/217* (2006.01)

(52) U.S. Cl. ........................ 348/308; 348/241

(58) Field of Classification Search .................. 348/294, 348/296, 308, 301, 241, 208.1, 370, 239
See application file for complete search history.

(56) References Cited

U.S. PATENT DOCUMENTS

| 5,442,393 | A  | * | 8/1995  | Yamanaka et al. | 348/252  |
|-----------|----|---|---------|-----------------|----------|
| 6,927,796 | B2 | * | 8/2005  | Liu et al.      | 348/297  |
| 7,468,501 | B2 | * | 12/2008 | Pain            | 250/208.1|
| 7,538,304 | B2 | * | 5/2009  | Ladd            | 250/200  |
| 7,697,051 | B2 | * | 4/2010  | Krymski         | 348/308  |

* cited by examiner

*Primary Examiner* — Mohammed Hasan

(74) *Attorney, Agent, or Firm* — Turocy & Watson, LLP

(57) ABSTRACT

Systems and methods are provided that facilitate reducing noise within sampled video information in a CMOS sensor imager. A multi-capacitor sample and hold can capture multiple samples of video information during at least partially overlapping time intervals. The multi-capacitor sample and hold can include a plurality of capacitors and a plurality of sampling switches, wherein each of the sampling switches can be coupled to a respective one of the plurality of capacitors. The plurality of sampling switches can be closed at a substantially concurrent time to begin capturing samples with the plurality of capacitors. Thereafter, the plurality of sampling switches can each be opened at respective disparate times to collect differing noise samples with each of the plurality of capacitors. A readout component can combine (e.g., average) the samples obtained by the plurality of capacitors, thereby reducing noise levels.

20 Claims, 11 Drawing Sheets

NOISE REDUCTION FOR ANALOG VIDEO APPLICATIONS

BACKGROUND

Recent technological advances have led to complementary metal-oxide-semiconductor (CMOS) sensor imagers being leveraged by cameras, video systems, and the like. CMOS sensor imagers can include an integrated circuit with an array of pixel sensors, each of which can comprise a photodetector. Moreover, a CMOS sensor imager can be incorporated into a System-on-Chip (SoC). As such, the SoC can integrate various components (e.g., analog, digital, . . . ) associated with imaging into a common integrated circuit. For instance, the SoC can include a microprocessor, microcontroller, or digital signal processor (DSP) core, memory, analog interfaces (e.g., analog to digital converters, digital to analog converters), and so forth.

Visible imaging systems implemented using CMOS imaging sensors can reduce costs, power consumption, and noise while improving resolution. For instance, cameras can use CMOS imaging System-on-Chip (iSoC) sensors that efficiently marry low-noise image detection and signal processing with multiple supporting blocks that can provide timing control, clock drivers, reference voltages, analog to digital conversion, digital to analog conversion and key signal processing elements. High-performance video cameras can thereby be assembled using a single CMOS integrated circuit supported by few components including a lens and a battery, for instance. Accordingly, by leveraging iSoC sensors, camera size can be decreased and battery life can be increased. Also, dual-use cameras have emerged that can employ iSoC sensors to alternately produce high-resolution still images or high definition (HD) video.

A CMOS imaging sensor can include an array of pixel cells, where each pixel cell in the array can include a photodetector (e.g., photogate, photoconductor, photodiode, . . . ) that overlays a substrate for yielding a photo-generated charge. A readout circuit can be provided for each pixel cell and can include at least a source follower transistor. The pixel cell can also include a floating diffusion region connected to a gate of the source follower transistor. Accordingly, charge generated by the photodetector can be sent to the floating diffusion region. Further, the imaging sensor can include a transistor for transferring charge from the photodetector to the floating diffusion region and another transistor for resetting the floating diffusion region to a predetermined charge level prior to charge transference.

Output from a pixel included in a particular column of a pixel array can be provided to a voltage amplifier corresponding to the particular column. The voltage amplifier can amplify analog video information (e.g., a signal, . . . ) read out from the pixel in the particular column as well as other pixels in the particular column. Analog video information yielded from each pixel cell is oftentimes memorized into a sampling capacitor at an output of the voltage amplifier corresponding to the column. Employment of such conventional techniques, however, can result in noise introduced from active elements after the photodetector and before the sampling capacitor being stored on the capacitor, which can degrade overall signal-to-noise ratio (SNR).

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate reducing noise within sampled video information in a CMOS sensor imager. A multi-capacitor sample and hold can capture multiple samples of video information during at least partially overlapping time intervals. The multi-capacitor sample and hold can include a plurality of capacitors and a plurality of sampling switches, wherein each of the sampling switches can be coupled to a respective one of the plurality of capacitors. The plurality of sampling switches can be closed at a substantially concurrent time to begin capturing samples with the plurality of capacitors. Thereafter, the plurality of sampling switches can each be opened at respective disparate times to collect differing noise samples with each of the plurality of capacitors. A readout component can combine (e.g., average) the samples obtained by the plurality of capacitors, thereby reducing noise levels.

According to various aspects, a set of sampling switches of a multi-capacitor sample and hold, each connected to a respective capacitor, can be closed at a substantially concurrent time. A first sampling switch coupled to a first capacitor can be opened at a first time and a second sampling switch coupled to a second capacitor can be opened at a second time. Opening of the sampling switches can discontinue sampling of an output from a column buffer. Moreover, a delay between the first time and the second time can be selected as a function of noise. It is contemplated that the delay can be pre-programmed, altered during runtime, calibrated, and so forth. Moreover, a set of readout switches, each coupled to a respective capacitor, can be closed for a period of time (and thereafter opened) to average samples collected by the capacitors.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
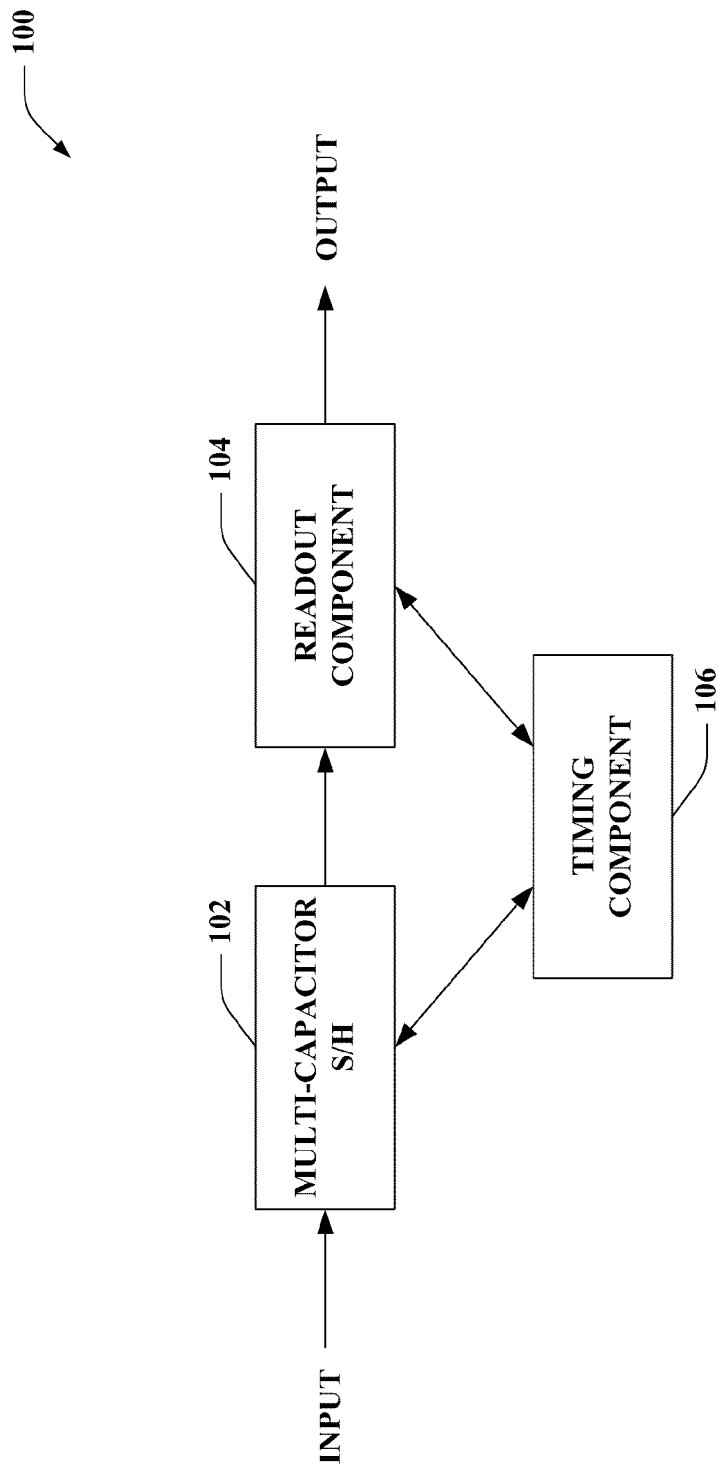
FIG. 1 illustrates a system that samples video information (e.g., an input, . . . ) using a plurality of sampling capacitors in a CMOS sensor imager.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

With reference to FIG. 1, illustrated is a system 100 that samples video information (e.g., an input, . . . ) using a plurality of sampling capacitors in a CMOS sensor imager. The system 100 can mitigate noise contributed from active elements by sampling the video information with two or more sampling capacitors. Multiple samples (e.g., each captured by a disparate sampling capacitor, . . . ) of the video information can be unified, thereby enhancing SNR. The system 100 can include a multi-capacitor sample and hold (S/H) 102 that obtains the plurality of samples, a readout component 104 that yields an output from the multi-capacitor S/H 102, and a timing component 106 that coordinates operations of the multi-capacitor S/H 102 and the readout component 104.

The multi-capacitor S/H 102 can obtain an input (e.g., video information, . . . ) from a pixel in a pixel array. The multi-capacitor S/H 102 includes multiple capacitors. It is to be appreciated, for example, that the multi-capacitor S/H 102 can include substantially any number of capacitors (e.g., two, three, four, five, . . . ). Further, since the multi-capacitor S/H 102 includes multiple capacitors, a plurality of samples of the input can be retained, each sample by a respective one of the capacitors. Moreover, the plurality of samples can be combined. The readout component 104, for example, can combine the plurality of samples collected by the multi-capacitor S/H 102. It is to be appreciated that the multi-capacitor S/H 102 can include parallel plate capacitors, metal-oxide-semiconductor capacitors (MOSCAPs), and the like; however, the claimed subject matter is not so limited.

The multi-capacitor S/H 102 can additionally include a plurality of switches (e.g., each of the switches can be associated with a respective one of the plurality of capacitors of the multi-capacitor S/H 102, . . . ). The switches of the multi-capacitor S/H 102 can be used to connect the respective capacitors to the input and disconnect the respective capacitors from the input. The plurality of capacitors included in the multi-capacitor S/H 102 can be simultaneously connected to the input (e.g., from the pixel, yielded by an amplifier, . . . ) in order to begin charging these capacitors together at a current video level at a given time. The plurality of capacitors of the multi-capacitor S/H 102 can be in parallel to each other. Moreover, the plurality of capacitors included in the multi-capacitor S/H 102 can also be disconnected from the input at respective, disparate times. Hence, the plurality of capacitors can each obtain respective samples of the video information during at least partially overlapping time intervals. A concurrent connection time of the capacitors to the input can allow for sampling a common signal, while disparate disconnection times can enable yielding multiple noise samples. Thus, noise can be reduced by combining these differing noise samples.

Moreover, the readout component 104 can read the samples obtained by the plurality of capacitors of the multi-capacitor S/H 102. For instance, the readout component 104 can include a plurality of readout switches, where each capacitor can be associated with a corresponding readout switch. Use of the readout component 104 can enable the plurality of samples to be combined, thereby yielding an output with reduced noise. By way of illustration, the plurality of switches of the readout component 104 can simultaneously be closed to join the plurality of samples collected by the multi-capacitor S/H 102 to generate the output.

Further, the timing component 106 can control timing for sampling the input with the plurality of capacitors of the multi-capacitor S/H 102 and/or yielding the output with the readout component 104. By way of illustration, the timing component 106 can manage opening and closing switches included in the multi-capacitor S/H 102 and/or the readout component 104 at corresponding times. The timing component 106 can coordinate connecting capacitors of the multi-capacitor S/H 102 to the input at a common time and disconnecting each of these capacitors from the input at differing times from each other to capture disparate noise samples. For example, the timing component 106 can control a difference in time between when a first capacitor of the multi-capacitor S/H 102 and a second capacitor of the multi-capacitor S/H 102 are disconnecting from the input. The difference in time can be preset, determined at runtime (e.g., based upon monitored conditions, . . . ), optimized, and so forth. Moreover, the timing component 106 can coordinate closing switches included in the readout component 104 at a common time to combine the samples obtained by the multi-capacitor S/H 102.

Figure 2:
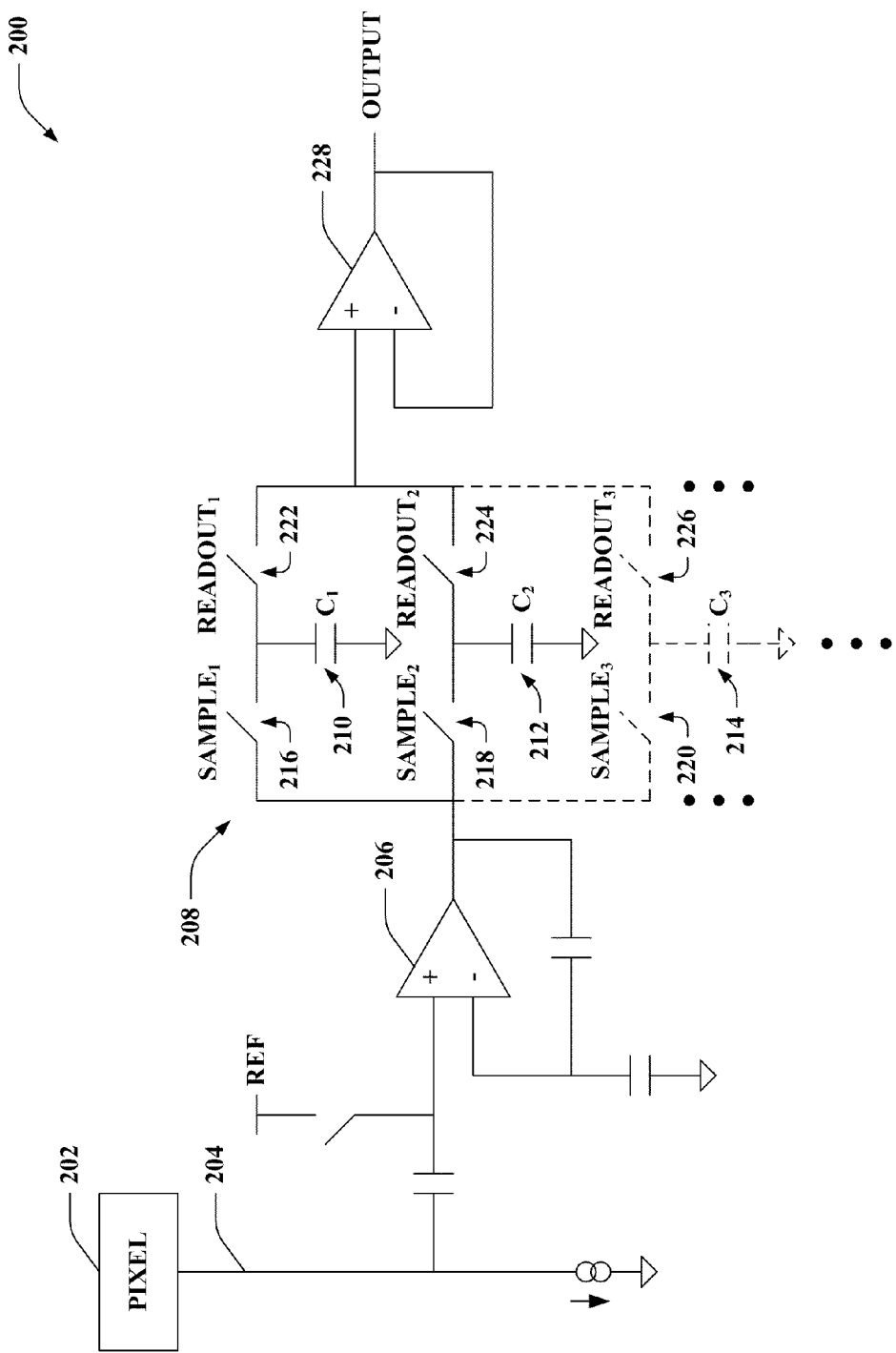
FIG. 2 illustrates an example system that leverages a multi-capacitor sample and hold (S/H) to reduce noise for analog video applications.

Turning to FIG. 2, illustrated is a system 200 that leverages a multi-capacitor sample and hold (S/H) to reduce noise for analog video applications. The system 200 includes a pixel 202 that can convert optical energy into electrical energy. Further, the pixel 202 can be read out via a read bus 204. For instance, the pixel 202 can be located in a particular column of a pixel array, and other pixels in the particular column can also be read out via the read bus 204 (e.g., at disparate times, . . . ). It is to be appreciated, however, that more than one column of pixels from a pixel array can be read out with a common read bus (e.g., read bus 204, . . . ).

The read bus 204 can further be coupled to a column buffer 206. The column buffer 206 can amplify (e.g., condition, . . . ) a signal from the pixel 202 obtained via the read bus 204. The column buffer 206, however, can introduce noise into an outputted signal. Additionally or alternatively, other active elements after a photodiode of the pixel 202 can introduce noise.

Conventional techniques oftentimes leverage memorizing video information at the output of the column buffer 206 into a sampling capacitor. Thus, noise from the active elements after the photodiode of the pixel 202 and before such sampling capacitor can be stored on the sampling capacitor, which can degrade overall SNR.

In contrast, the system 200 samples the video information yielded by the column buffer 206 using a plurality of sampling capacitors. While some common approaches employ collecting separate samples during distinct time periods and averaging these separate samples using digital and/or analog components (e.g., such sampling implies doubling the sampling time which can be unfeasible for high speed video applications, . . . ), the system 200 utilizes a multi-capacitor sample and hold (S/H) 208 (e.g., the multi-capacitor S/H 102 of FIG. 1, . . . ) to connect sampling capacitors to the output of the column buffer 206 at a substantially similar time during sampling in order to charge them together at a correct video level. Further, the sampling capacitors of the multi-capacitor S/H 208 can each be disconnected at respective, different times, thus resulting in distinct noise samples. The amount of extra time that can be utilized in connection with the multi-capacitor S/H 208 can be a temporal distance between noise times the number of samples. Accordingly, an extent to which noise samples are correlated can be a function of the amount of extra time. Further, the amount of extra time can be much less than an overall sampling time; however, the claimed subject matter is not so limited. Moreover, noise samples can increasingly become uncorrelated as the amount of extra time is increased (and vice versa). For instance, in the case of two sampling capacitors, the expected benefit can be on the order of square root of two when the noise at the amplifier output dominates the kT/C sampling noise (e.g., noise in the yielded output can be decreased by a square root of two, . . . ).

The multi-capacitor S/H 208 can include a plurality of capacitors (e.g., $C_1$ 210, $C_2$ 212, $C_3$ 214, . . . ). According to an example, the multi-capacitor S/H 208 can include two capacitors 210-212. By way of a further example, the multi-capacitor S/H 208 can include three capacitors 210-214. Moreover, it is to be appreciated that the multi-capacitor S/H 208 can include more than three capacitors. Further, the capacitors 210-214 of the multi-capacitor S/H 208 can each have substantially similar capacitances in comparison to each other; yet, the claimed subject matter is not so limited (e.g., capacitances of one or more of the capacitors 210-214 can differ from capacitances of a disparate one or more of the capacitors 210-214, . . . ).

Each capacitor 210-214 of the multi-capacitor S/H 208 can be coupled to a respective, corresponding sampling switch. For instance, capacitor $C_1$ 210 can be associated with sampling switch 1 (sample$_1$) 216 and capacitor $C_2$ 212 can be associated with sampling switch 2 (sample$_2$) 218. Further, if the multi-capacitor S/H 208 includes a third capacitor (e.g., $C_3$ 214, . . . ), such capacitor can be associated with sampling switch 3 (sample$_3$) 220, and so forth.

The following provides an example where the multi-capacitor S/H 208 includes two capacitors 210-212 and two corresponding sampling switches 216-218; however, it is to be appreciated that this example can be extended to an example multi-capacitor S/H with more than two capacitors. Following this example, sampling switches 216-218 can be closed at a substantially similar time to begin sampling. When sampling switches 216-218 are closed, the capacitors 210-212 can be charged based upon the output from the column buffer 206. Moreover, the sampling switches 216-218 can be opened at subsequent times. Opening and/or closing of the sampling switches 216-218 can be controlled by a timing component (e.g., the timing component 106 of FIG. 1, . . . ) (not shown).

According to an illustration, the sampling switches 216-218 can both be opened at a substantially similar time (e.g., after a period of time during which the capacitors 210-212 can be charged from the output from the column buffer 206, . . . ). By opening the sampling switches 216-218 concurrently, the multi-capacitor S/H 208 can effectively operate similarly to a sample and hold that includes one capacitor (e.g., with a capacitance equal to a capacitance of $C_1$ 210 plus a capacitance of $C_2$ 212, . . . ) and one switch. Contemporaneous opening of the sampling switches 216-218 can be effectuated for slower frame rates and/or higher SNR.

By way of another illustration, the sampling switches 216-218 can be opened at differing times. For example, following this illustration, the sampling switches 216-218 can both be simultaneously closed to begin sampling the output of the column buffer 206; thereafter, the sampling switch 1 216 can be opened at a first time, and the sampling switch 2 218 can be opened at a second time. It is contemplated that the first time can be before or after the second time. Staggering the opening of the sampling switches 216-218 can lead to differing noises being sampled by the capacitors 210-212. Moreover, the length of time between closing and opening each of the sampling switches 216-218 typically must be sufficient to allow the respective capacitors 210-212 to reach the output value yielded by the column buffer 206. Further, correlation between noise in the samples collected by the capacitors 210-212 can be a function of the delay between the first time at which the sampling switch 1 216 is opened and the second time at which the sampling switch 2 218 is opened. For instance, the noise can become increasingly decorrelated as the delay between the first time and the second time increases, and vice versa.

The system 200 can also include a plurality of readout switches (e.g., readout switch 1 (readout$_1$) 222, readout switch 2 (readout$_2$) 224, readout switch 3 (readout$_3$) 226, . . . ). For instance, the readout switches 222-226 can be the readout component 104 of FIG. 1. Further, the number of readout switches 222-226 included in the system 200 can match the number of capacitors 210-214 included in the multi-capacitor S/H 208. Thus, if the system 200 includes two capacitors 210-212, then the system 200 can include two readout switches 222-224. Moreover, if the system 200 includes more than two capacitors 210-214, then the system 200 can include more than two readout switches 222-226.

The readout switches 222-226 can be open while the output of the column buffer 206 is sampled with the capacitors 210-214 (e.g., sampling can be effectuated by one or more of the sampling switches 216-220 being closed at a given time, . . . ). Subsequent to completion of the sampling (e.g., after the sampling switches 216-220 return to an open state, . . . ), the readout switches 222-226 can be closed. According to an example, the readout switches 222-226 can each be closed at a substantially similar time after completion of the sampling. Following this example, substantially simultaneous closing of the readout switches 222-226 can cause the sampled values collected by the capacitors 210-214 to be combined. This combined value can further be provided as input to a buffer amplifier 228. The buffer amplifier 228 can yield an output, which can be further processed. The readout switches 222-226 can thereafter be opened to allow for subsequent sampling. Although not depicted, opening and/or closing of the readout switches 222-226 can be controlled by a timing component (e.g., the timing component 106 of FIG. 1, . . . ) (not shown).

Figure 3:
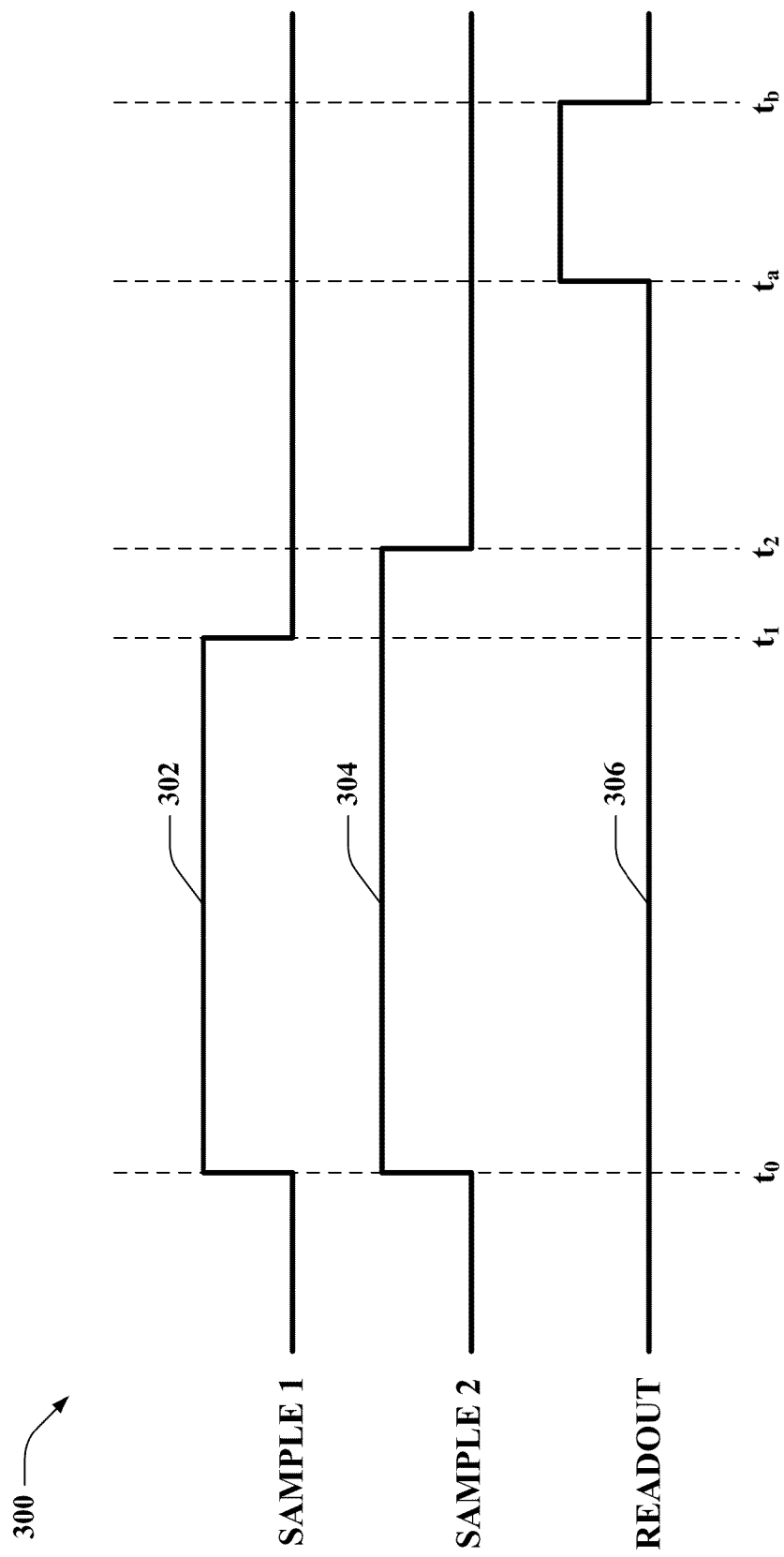
FIGS. 3-4 illustrate example timing diagrams for a multi-capacitor sample and hold that can be leveraged in connection with a CMOS sensor imager in accordance with various aspects of the claimed subject matter.
Figure 4:
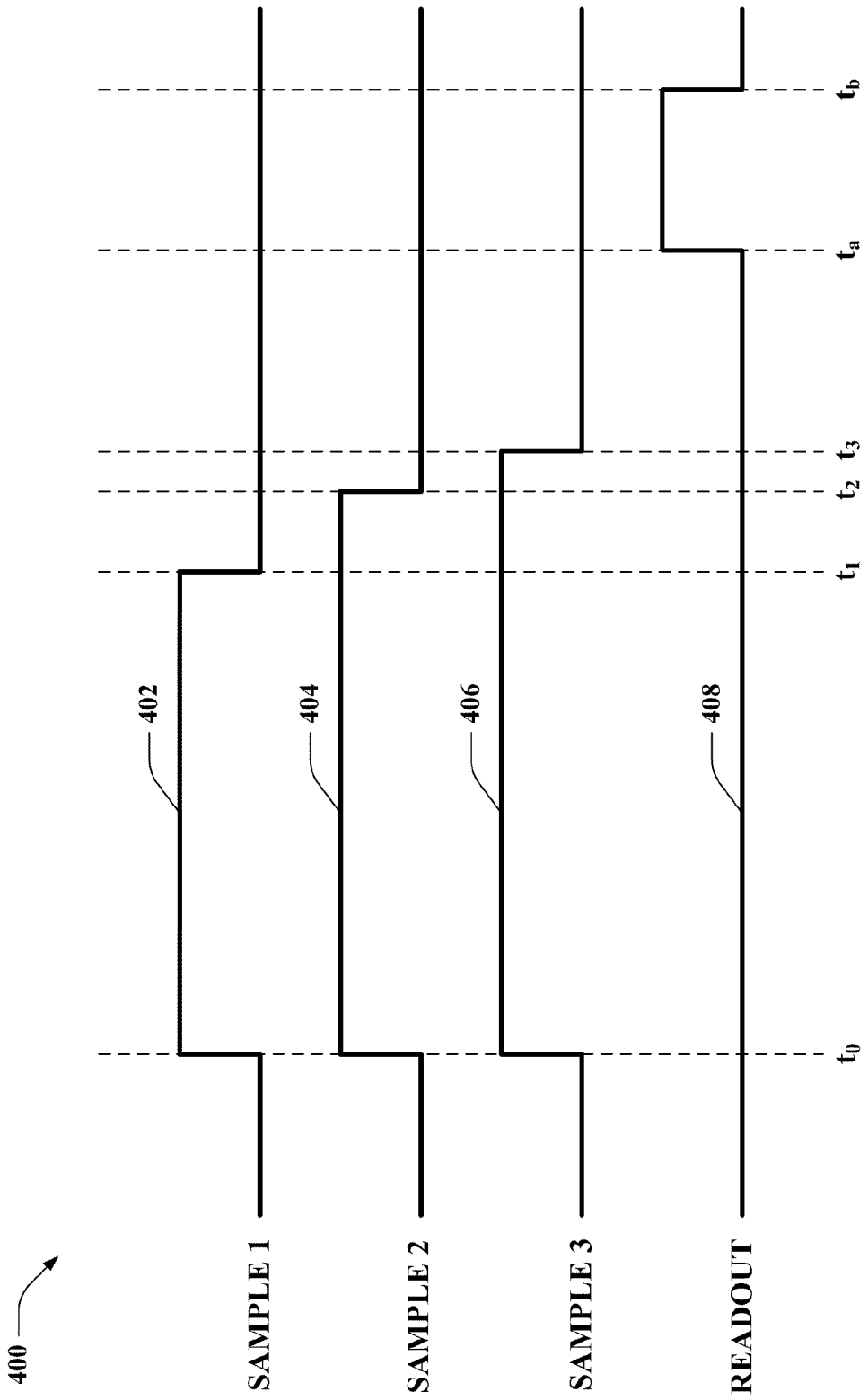

With reference to FIGS. 3 and 4, illustrated are example timing diagrams for a multi-capacitor sample and hold that can be leveraged in connection with a CMOS sensor imager in accordance with various aspects of the claimed subject matter. FIGS. 3 and 4 show the timing of sampling and readout. For instance, the timing can correspond to opening and closing of the sampling switches 216-220 and opening and closing of the readout switches 222-226. It is to be appreciated that the example timing diagrams depict illustrations of possible sampling and readout techniques that can be employed. It is to be appreciated, however, that other sampling and readout techniques other than the illustrated examples are intended to fall within the scope of the hereto appended claims.

Turning to FIG. 3, illustrated is an example multi-capacitor sample and hold timing diagram 300. The timing diagram 300 can be employed in connection with a multi-capacitor sample and hold that includes two capacitors that can collect samples. At time t0, a first sample (sample 1 302) and a second sample (sample 2 304) can begin to be collected. For example, sample 1 302 can be obtained with a first capacitor of the multi-capacitor sample and hold, and sample 2 304 can be obtained with a second capacitor of the multi-capacitor sample and hold. Following this example, a first sampling switch coupled to the first capacitor and a second sampling switch coupled to the second capacitor can both be closed at time t0.

At time $t_1$, sample 1 302 can be discontinued, while sample 2 304 can continue to be collected. For example, the first sampling switch coupled to the first capacitor used to collect sample 1 302 can be opened at time $t_1$. Moreover, the second sampling switch coupled to the second capacitor used to collect sample 2 304 can remain closed at time $t_1$.

At time $t_2$, sample 2 304 can be discontinued. By way of illustration, sample 2 304 can be halted by opening the second sampling switch, which is coupled to the second capacitor utilized to collect sample 2 304.

At time $t_a$, readout 306 of the samples can be initiated. For instance, readout switches (e.g., a first readout switch coupled to the first capacitor and a second readout switch coupled to the second readout capacitor, . . . ) can concurrently be closed at time $t_a$ to begin combining the two samples (e.g., sample 1 302 and sample 2 304, . . . ). The samples can be averaged when the readout switches are closed at substantially similar times. Further, readout 306 can be discontinued at time $t_b$. Readout 306 can be stopped by opening the readout switches at time $t_b$.

The delay between $t_1$ and $t_2$ can correspond to an amount of noise correlation in sample 1 302 and sample 2 304. Hence, to control the noise correlation, the delay can be determined a priori, at runtime, calibrated, and so forth. Pursuant to an example, the delay can be programmed for the multi-capacitor sample and hold; however, the claimed subject matter is not so limited. For instance, an optimal delay can be a function of the type of noise. The delay can be set to a shorter length of time for white noise or when an amplifier (e.g., the column buffer 206 of FIG. 2, . . . ) has a pole at zero. However, when 1/F noise is exhibited in the samples, the delay can be set to a longer length of time. Thus, different delays can be selected as a function of the shape of the noise.

Now referring to FIG. 4, illustrated is an example timing diagram 400 associated with a multi-capacitor sample and hold that includes three capacitors. At time t0, collection of a first sample (sample 1 402), a second sample (sample 2 404), and a third sample (sample 3 406) can begin (e.g., by closing sampling switches, each coupled to a corresponding one of the three capacitors of the multi-capacitor sample and hold, . . . ). Sample 1 402 can be halted at time $t_1$, sample 2 404 can be stopped at time $t_2$, and sample 3 406 can be discontinued at time $t_3$ (e.g., by opening respective sampling switches, . . . ). Further, readout 408 of the three samples can begin at time $t_a$ and end at time $t_b$.

Different ending times (e.g., $t_1$, $t_2$, $t_3$, . . . ) associated with sample 1 402, sample 2 404, and sample 3 406 enable disparate noise levels to be captured. Thereafter, the noise can be averaged upon combining the samples via readout 408. Similar to the example depicted in FIG. 3, differing delays (e.g., between $t_1$ and $t_2$, $t_2$ and $t_3$, $t_1$ and $t_3$, . . . ) can be optimally selected to mitigate noise in the resultant signal yielded upon averaging via readout 408. The delays can be programmed, updated at runtime, calibrated, or the like.

Figure 5:
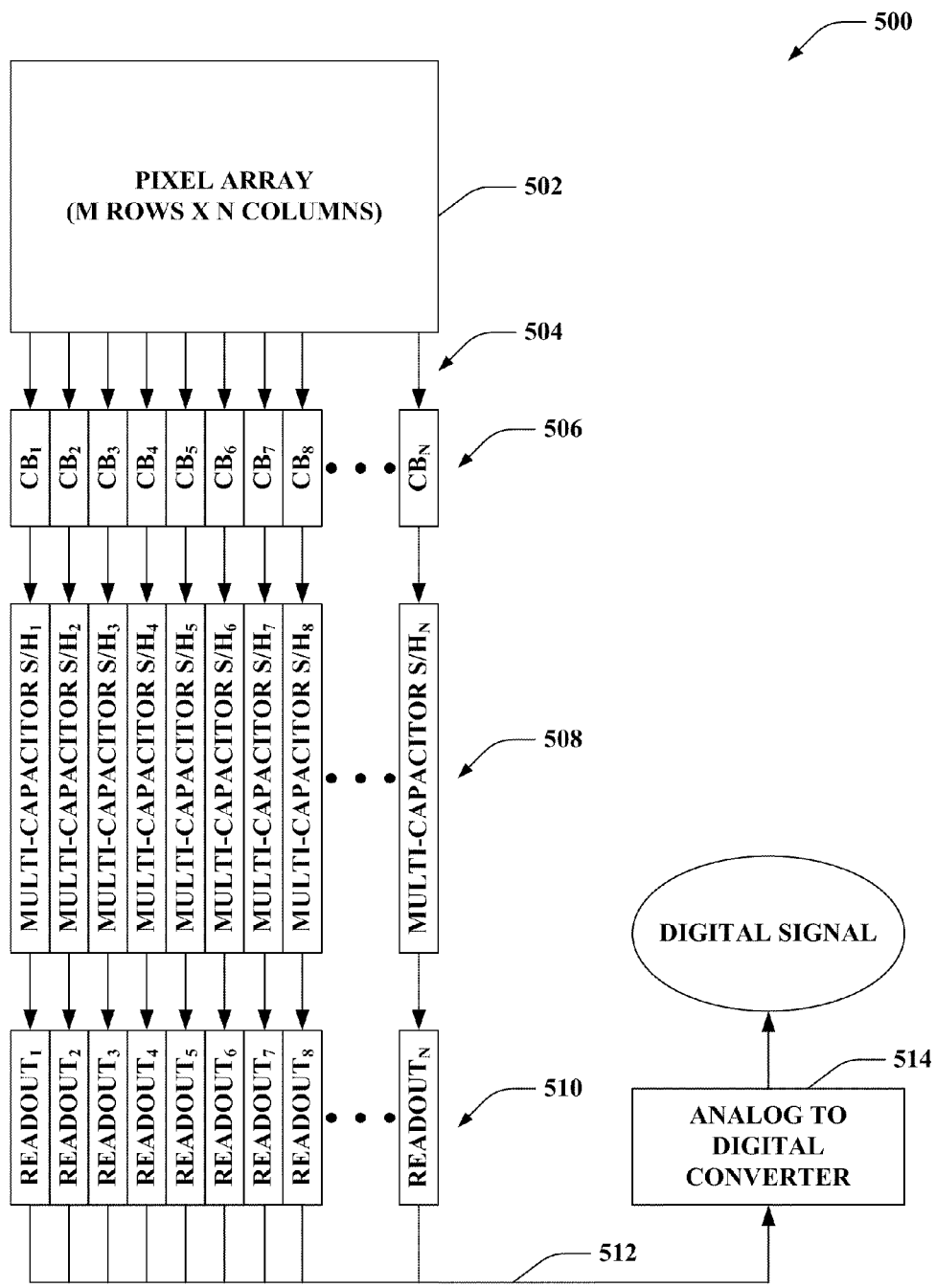
FIG. 5 illustrates an example system that collects and averages multiple samples from pixels in a CMOS sensor imager.

With reference to FIG. 5, illustrated is a system 500 that collects and averages multiple samples from pixels in a CMOS sensor imager. The system 500 can be associated with a CMOS sensor imager utilized in connection with a camcorder, digital camera, microscope, video system, and/or the like. The system 500 comprises a pixel array 502 that can include M rows and N columns of pixel cells, where M and N can be any integers. Each pixel in the pixel array 502 can comprise a photodetector (e.g., photogate, photoconductor, photodiode, . . . ). Further, each pixel in the pixel array 502 can be utilized to detect a particular color of light; thus, a subset of the pixels in the pixel array 502 can operate in response to red light (R pixels), a disparate subset of the pixels can operate based upon blue light (B pixels) and a further subset of the pixels can operate as a function of green light (G pixels). Other color filter patterns are also possible. It is to be appreciated, however, that the claimed subject matter is not limited to the foregoing.

An image focused on the pixel array 502 can cause the pixels to convert incident light into electrical energy. Signals obtained by the pixel array 502 can be processed on a column by column basis; thus, a particular row of pixels from the pixel array 502 can be selected to be read. During a readout cycle, each pixel can provide two voltages, and the difference between these two voltages can be measured. The system 500 can further include a plurality of read buses 504 that can transfer the contents from the pixels in the pixel array 502 in the selected row. According to an illustration, the system 500 can include N read buses 504, where each read bus 504 can be associated with a respective column of the pixel array 502. By way of further example, pixels in the pixel array 502 can share read buses 504, and thus, the system 500 can include fewer than N read buses 504. Pursuant to another illustration, each column of the pixel array 502 can be associated with more than one read bus 504; hence, the system 500 can include more than N read buses 504.

Each read bus 504 can carry content (e.g., sampled signals, . . . ) from the pixels to a respective column buffer (CB) 506. The system 500 can include N column buffers 506 or fewer, for instance. The column buffers 506 can amplify (e.g., condition, . . . ) the signals from the pixels. Further, each column buffer 506 can enable low noise readout and can condition the signal from a pixel positioned at one of the rows in the column (or columns) corresponding to the column buffer 506.

After processing by the column buffers 506, outputted values from each of the column buffers 506 can be retained. Moreover, each of the column buffers 506 can be associated with a respective multi-capacitor sample and hold (S/H) 508 as described herein. It is to be appreciated, for instance, that substantially any number of capacitors and sampling switches can be included in the multi-capacitor S/Hs 508. The multi-capacitor S/Hs 508 can sample and hold outputted values from the corresponding column buffers 506. For example, the plurality of capacitors of each of the multi-capacitor S/Hs 508 can be loaded with the outputted values from the corresponding column buffers 506. Further, readout switches 510 associated with a given one of the multi-capacitor S/H 508 can be closed at a substantially similar time, yet at a differing time from readout switches 510 associated with the other multi-capacitor S/Hs 508 to allow for connecting to a bus 512; thus, the voltages generated by the column buffers 506 can be multiplexed over the bus 512. The bus 512 can enable communicating each of the outputted values from the respective column buffers 506 to an analog to digital converter (ADC) 514. The ADC 514 can digitize the sampled signal to yield a digital signal. The digital signal can thereafter be provided to disparate component(s) (not shown) for further processing, manipulation, storage, display, and so forth.

Figure 6:
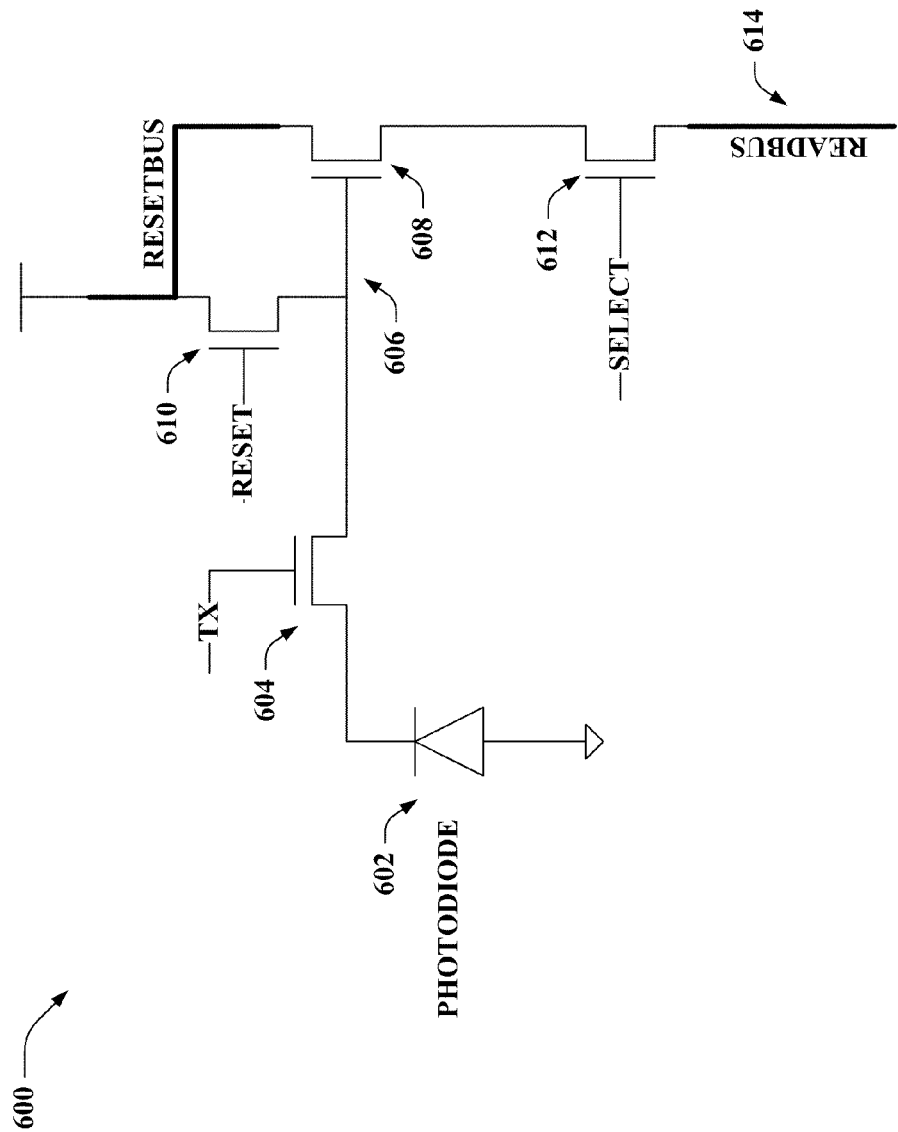
FIG. 6 illustrates an example CMOS imager pixel cell that can be included in a pixel array.

Now turning to FIG. 6, illustrated is an example CMOS imager pixel cell 600 that can be included in a pixel array (e.g., the pixel array 502 of FIG. 5). The pixel cell 600 can be a 4T pixel cell utilized in a CMOS iSoC. The pixel cell 600 includes a photodiode 602 connected to a transfer transistor 604. The transfer transistor 604 is further connected to a floating diffusion region 606. The floating diffusion region 606 connects to a source follower transistor 608 and a reset transistor 610. The source follower transistor 608 is further connected to a select transistor 612. The select transistor 612 can be employed to select a particular row of pixel cells from a pixel array. For instance, a select signal can be received at a gate of the select transistor 612 to read out a value from the floating diffusion region 606.

The photodiode 602 can be charged by converting optical energy to electrical energy. For instance, the photodiode 602 can have sensitivity to a particular type of incident light (e.g., red light, blue light, green light). Moreover, the type of light to which the photodiode 602 is sensitive can indicate a type of the pixel cell 600 (e.g., R pixel, B pixel, G pixel).

According to an illustration, the floating diffusion region 606 can be reset to a known state before transfer of charge to it. Resetting of the floating diffusion region 606 can be effectuated by the reset transistor 610. For example, a reset signal can be received at a gate of the reset transistor 610 to cause resetting of the floating diffusion region 606. Further, the transfer transistor 604 can transfer charge (e.g., yielded by the photodiode 602) to the floating diffusion region 606. The charge can be transferred based upon a transfer signal (TX) received at a gate of the transfer transistor 604. Light can be integrated at the photodiode 602 and electrons generated from the light can be transferred to the floating diffusion region 606 (e.g., in a noiseless or substantially noiseless manner) when the TX is received at the transfer transistor 604. Moreover, the pixel cell 600 (along with other pixel cell(s) in the same row of the pixel array) can be selected for readout by employing the select transistor 612. Readout can be effectuated via a read bus 614 (e.g., one of the read buses 104 of FIG. 1). Further, the source follower transistor 608 can output and/or amplify a signal representing a reset voltage (e.g., provided via a reset bus) and a pixel signal voltage based on the photo converted charges.

It is to be appreciated, however, that different pixel configurations other than the example illustrated in FIG. 6 are intended to fall within the scope of the heretoappended claims. For instance, a disparate pixel configuration can lack the transfer gate transistor 604. According to another illustration, a differing pixel configuration can include more than four transistors. Yet, it is to be appreciated that the claimed subject matter is not limited to the aforementioned examples.

Figure 7:
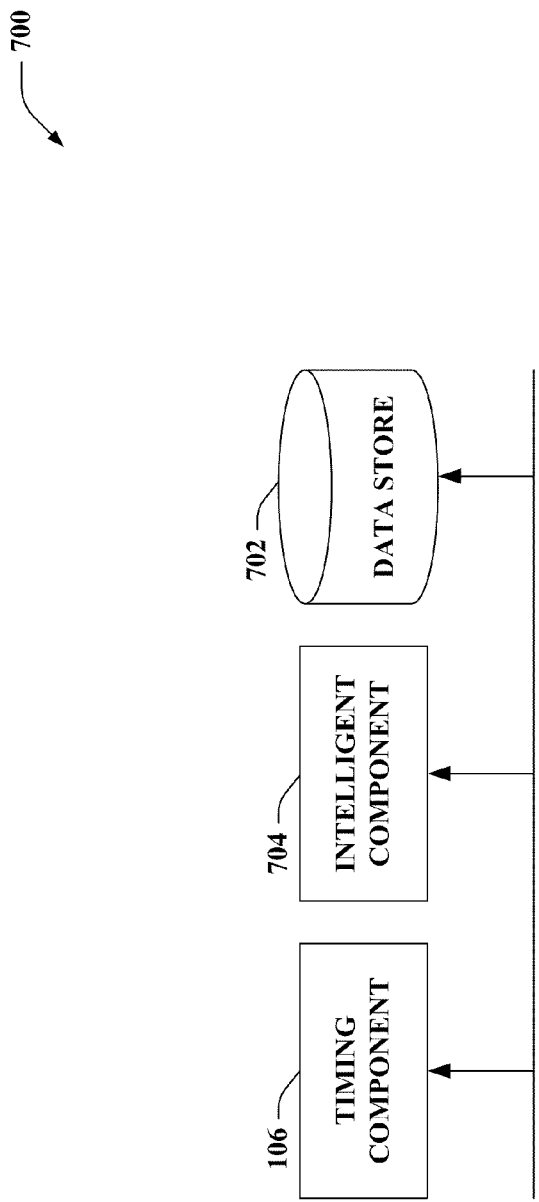
FIG. 7 illustrates an example system that coordinates sampling and readout of a multi-capacitor sample and hold in a CMOS sensor imager.

Referring to FIG. 7, illustrated is a system 700 that coordinates sampling and readout of a multi-capacitor sample and hold in a CMOS sensor imager. The system 700 includes the timing component 106 that controls timing of sampling and readout associated with a multi-capacitor sample and hold (e.g., multi-capacitor S/H 102 of FIG. 1, . . . ). Moreover, the system 700 can include a data store 702 and an intelligent component 704.

The timing component 106, for instance, can employ values for delay(s) to be utilized in connection with collecting disparate samples with differing capacitors of a common multi-capacitor sample and hold retained in the data store 702. According to another illustration, the data store 702 can retain instructions related to recalibrating such delay(s). The data store 702 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 702 of the subject systems and methods is intended to comprise, without being limited to, these and any other suitable types of memory. In addition, it is to be appreciated that the data store 702 can be a server, a database, a hard drive, and the like.

The intelligent component 704 can be employed by the timing component 106. For instance, the timing component 106 can leverage the intelligent component 704 to perform reasoning in connection with selecting optimal delay(s) to be employed when collecting differing samples with respective capacitors of a multi-capacitor sample and hold. By way of further illustration, the intelligent component 704 can be leveraged by the timing component 106 to infer that a condition occurred that triggers recalibration of the delay(s) utilized by the timing component 106.

It is to be understood that the intelligent component 704 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 8:
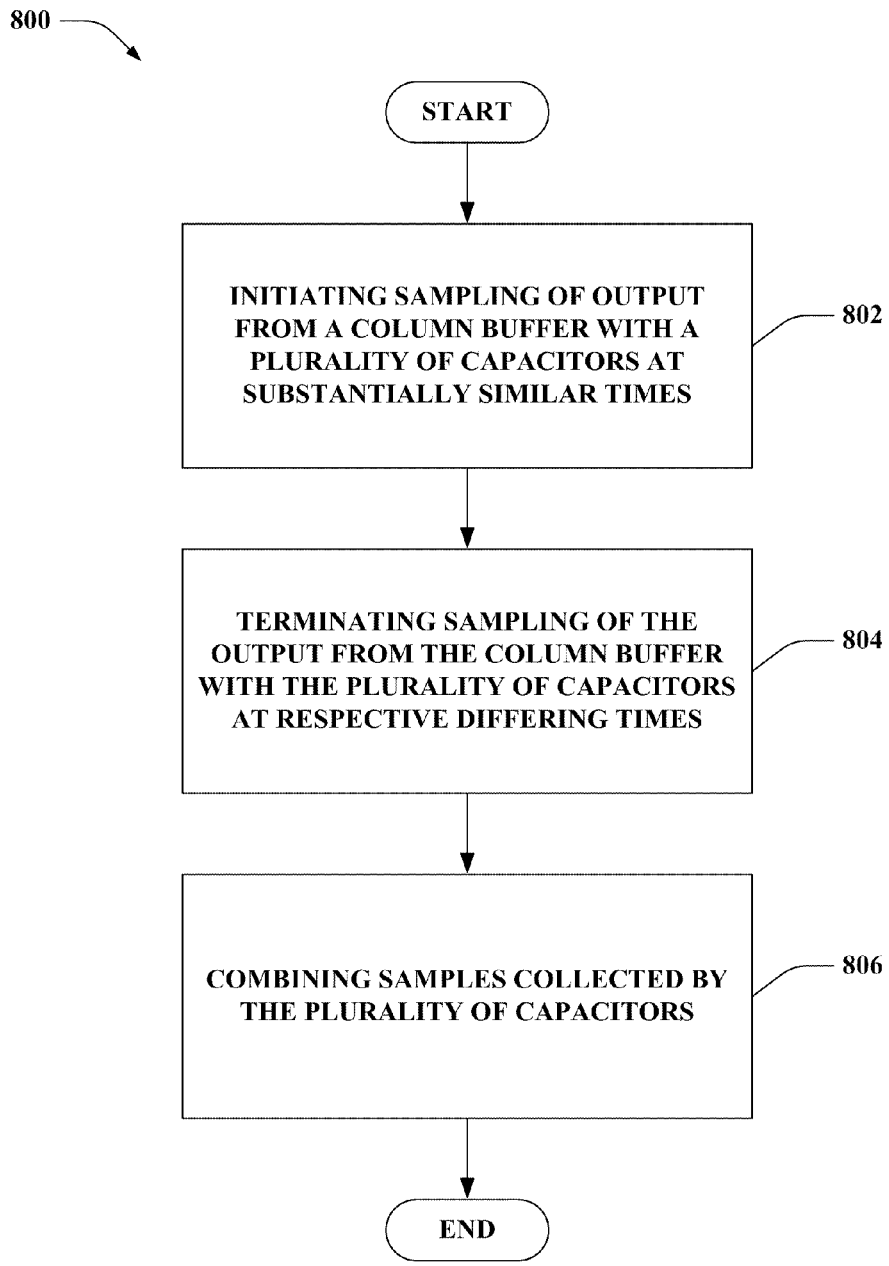
FIG. 8 illustrates an example methodology that facilitates joining multiple samples of video information in a CMOS sensor imager.
Figure 9:
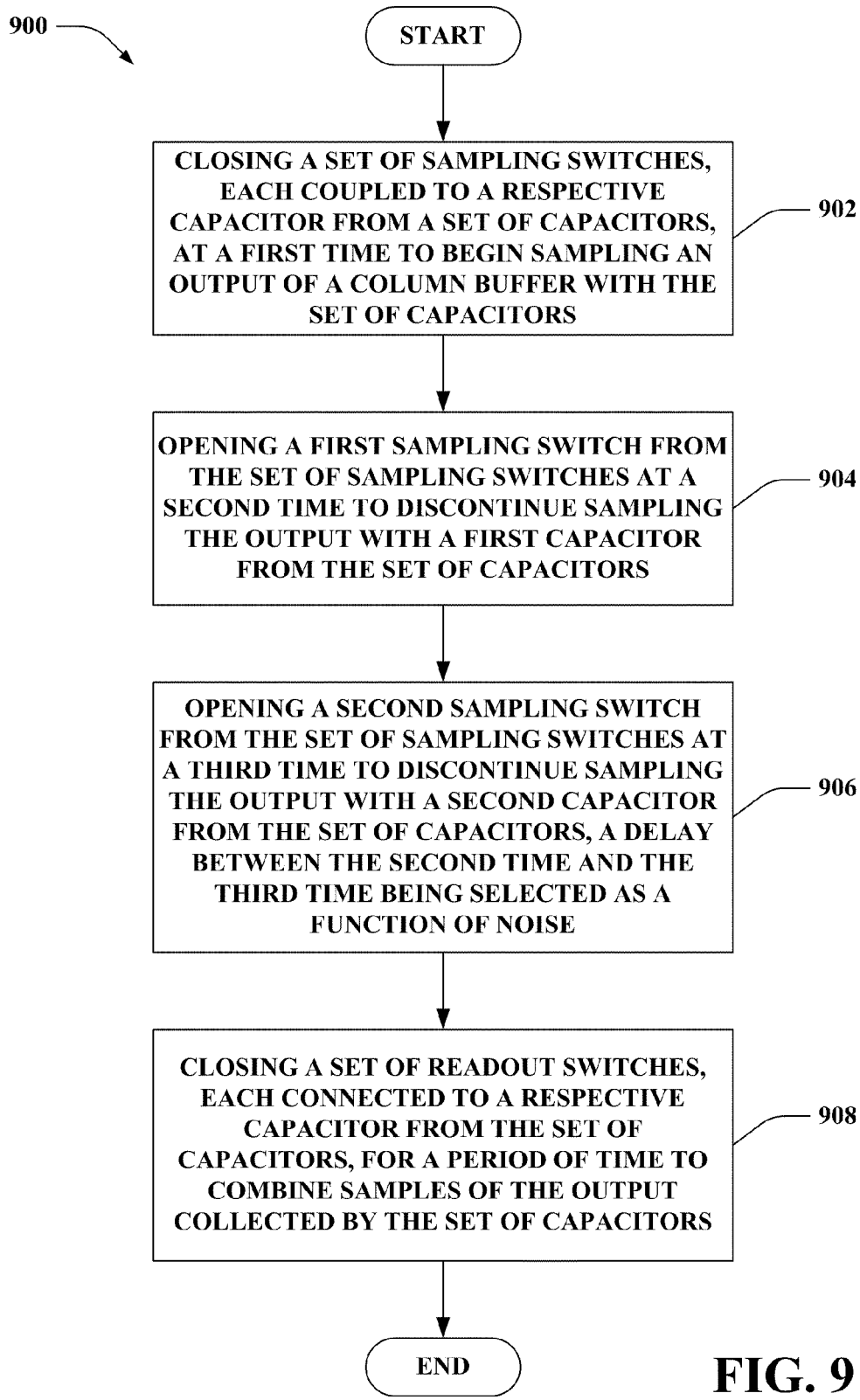
FIG. 9 illustrates an example methodology that facilitates controlling timing of sampling and readout of video information in a CMOS sensor imager.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 8, illustrated is a methodology 800 that facilitates joining multiple samples of video information in a CMOS sensor imager. At 802, sampling of output from a column buffer with a plurality of capacitors can be initiated at substantially similar times. By beginning the sampling at substantially similar times, a common video level (e.g., signal, . . . ) can be sampled. At 804, sampling of the output from the column buffer with the plurality of capacitors can be terminated at respective differing times. Accordingly, disparate noise levels can be collected by each of the plurality of capacitors. At 806, samples collected by the plurality of capacitors can be combined. For example, the samples can be averaged to reduce a resultant noise level.

Turning to FIG. 9, illustrated is a methodology 900 that facilitates controlling timing of sampling and readout of video information in a CMOS sensor imager. At 902, a set of sampling switches, each coupled to a respective capacitor from a set of capacitors, can be closed at a first time to begin sampling an output of a column buffer with the set of capacitors. For instance, the set of capacitors can include two capacitors and the set of sampling switches can include two sampling switches. By way of another example, the set of capacitors can include more than two capacitors and the set of sampling switches can include more than two sampling switches. At 904, a first sampling switch from the set of sampling switches can be opened at a second time to discontinue sampling the output with a first capacitor from the set of capacitors. At 906, a second sampling switch from the set of sampling switches can be opened at a third time to discontinue sampling the output with a second capacitor from the set of capacitors. Further, a delay between the second time and the third time can be selected as a function of noise. Moreover, the delay can be pre-programmed, chosen at runtime, calibrated, and so forth. For example, the delay can be chosen at runtime and/or calibrated based upon characteristics of the noise. Further, disparate sampling switch(es) can be opened at differing time(s) if the set of capacitors includes more than two capacitors. At 908, a set of readout switches, each connected to a respective capacitor from the set of capacitors, can be closed for a period of time to combine samples of the output collected by the set of capacitors. For instance, the samples can be averaged by concurrently closing the readout switches for the period of time, thereby reducing a noise level within a yielded signal. Further, the period of time can be subsequent to halting sampling of the output with all of the capacitors from the set of capacitors (e.g., opening the sampling switches associated with each of the capacitors from the set of capacitors, . . . ).

Figure 10:
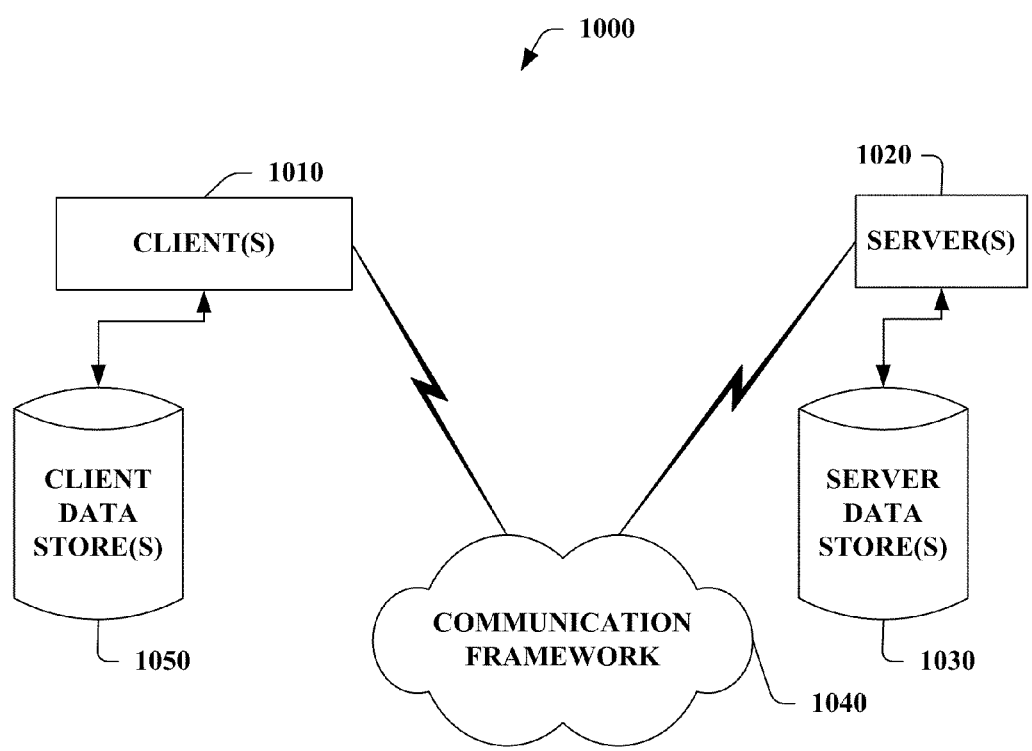
FIG. 10 illustrates an example networking environment, wherein the novel aspects of the claimed subject matter can be employed.
Figure 11:
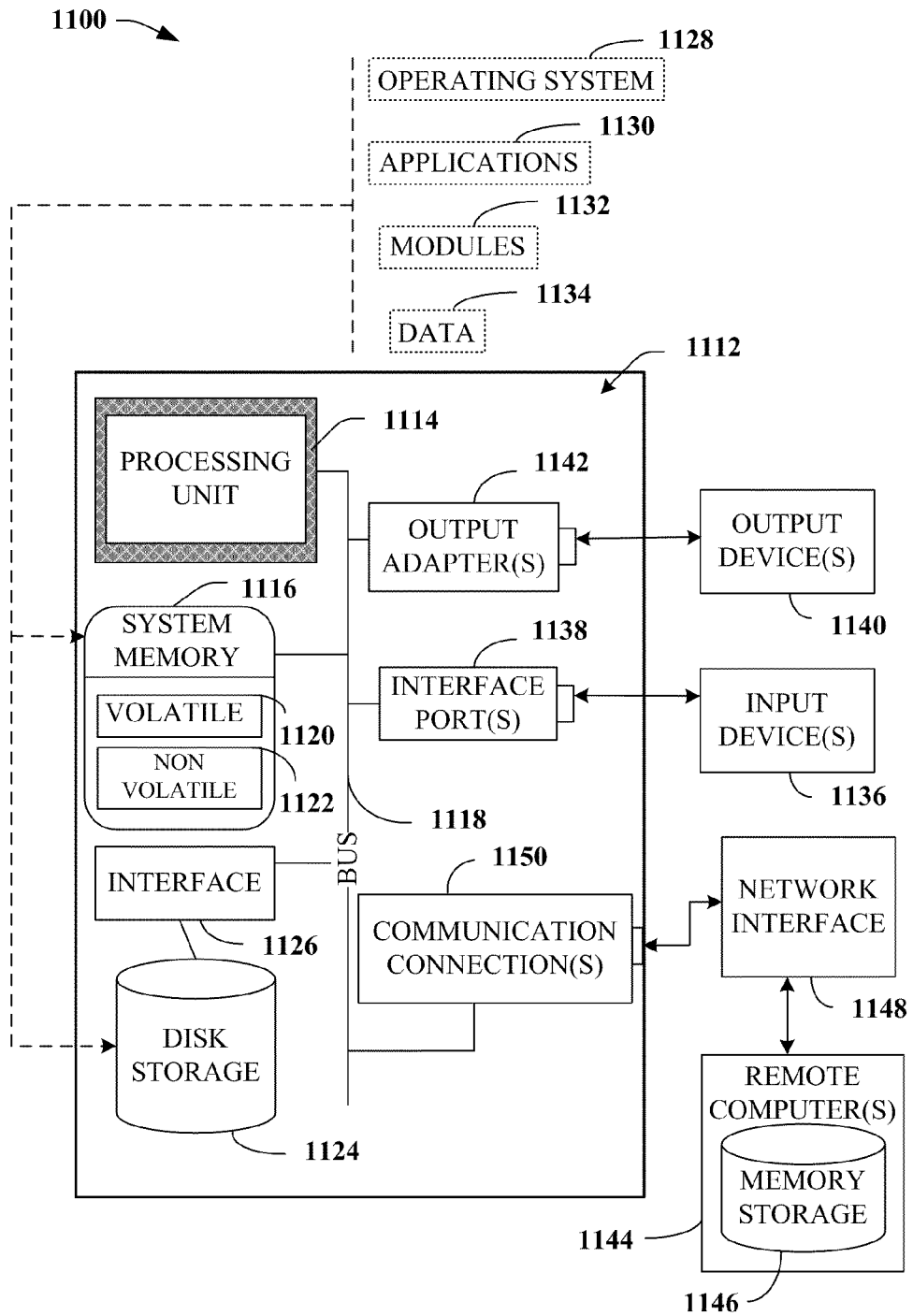
FIG. 11 illustrates an example operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For instance, FIGS. 10-11 set forth a suitable computing environment that can be employed in connection with combining multiple samples obtained from each column buffer to mitigate noise within CMOS sensor imagers. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that samples video information in a complementary metal-oxide-semiconductor (CMOS) sensor imager, comprising:
   a multi-capacitor sample and hold that includes a plurality of capacitors, wherein each of the plurality of capacitors captures a respective sample of video information during at least partially overlapping time intervals, wherein a delay between the time intervals is selected as a function of noise; and
   a readout component that combines the samples captured by the plurality of capacitors.

2. The system of claim 1, further comprising a timing component that coordinates sampling with the multi-capacitor sample and hold and readout with the readout component.

3. The system of claim 1, the multi-capacitor sample and hold further comprises a plurality of sampling switches, each of the plurality of sampling switches coupled to a respective one of the plurality of capacitors.

4. The system of claim 3, the plurality of sampling switches closed at a substantially similar time to begin charging the plurality of capacitors.

5. The system of claim 4, the plurality of sampling switches opened at respective disparate times to capture multiple noise samples.

6. The system of claim 5, the respective disparate times for opening the plurality of sampling switches being programmed based upon a type of noise.

7. The system of claim 1, the readout component further comprises a plurality of readout switches, each of the plurality of readout switches coupled to a respective one of the plurality of capacitors.

8. The system of claim 7, the plurality of readout switches closed for a substantially similar time period to average the samples captured by the plurality of capacitors.

9. The system of claim 1, the multi-capacitor sample and hold connected to an output of a column buffer.

10. The system of claim 1, the plurality of capacitors of the multi-capacitor sample and hold includes at least one of parallel plate capacitors or metal-oxide-semiconductor capacitors (MOSCAPs).

11. The system of claim 1, each of the plurality of capacitors of the multi-capacitor sample and hold having a substantially similar capacitance.

12. A method that facilitates joining multiple samples of video information in a CMOS sensor imager, comprising:
    initiating sampling of output from a column buffer with a plurality of capacitors at substantially similar times;
    terminating sampling of the output from the column buffer with the plurality of capacitors at respective differing times, wherein the differing times are selected as a function of noise; and
    combining samples collected by the plurality of capacitors.

13. The method of claim 12, further comprising averaging the samples collected by the plurality of capacitors to reduce a resultant noise level.

14. The method of claim 12, further comprising sampling a common video signal with each of the plurality of capacitors.

15. The method of claim 12, further comprising sampling differing noise levels with each of the plurality of capacitors.

16. A method that facilitates controlling timing of sampling and readout of video information in a CMOS sensor imager, comprising:
    closing a set of sampling switches, each coupled to a respective capacitor from a set of capacitors, at a first time to begin sampling an output of a column buffer with the set of capacitors;
    opening a first sampling switch from the set of sampling switches at a second time to discontinue sampling the output with a first capacitor from the set of capacitors;
    opening a second sampling switch from the set of sampling switches at a third time to discontinue sampling the output with a second capacitor from the set of capacitors, a delay between the second time and the third time being selected as a function of noise; and
    closing a set of readout switches, each connected to a respective capacitor from the set of capacitors, for a period of time to combine samples of the output collected by the set of capacitors.

17. The method of claim 16, further comprising employing a pre-programmed delay between the second time and the third time.

18. The method of claim 16, further comprising averaging the samples of the output collected by the set of capacitors to reduce a noise level.

19. The method of claim 16, wherein a length of the delay is inversely proportional to a correlation between noise samples collected by the first capacitor and the second capacitor.

20. The method of claim 16, further comprising calibrating the delay based upon characteristics of the noise.

* * * * *